(12) United States Patent
Jain et al.

(10) Patent No.: US 8,260,342 B2
(45) Date of Patent: Sep. 4, 2012

(54) COMMUNICATIONS SYSTEMS MANAGEMENT USING MM-WAVE BASED MOTION SENSING

(75) Inventors: Nitin Jain, San Diego, CA (US); Fnu Rajanish, San Diego, CA (US); Gaurav Menon, San Diego, CA (US)

(73) Assignee: Anokiwave, Inc., San Diego, CA (US)

( * ) Notice: Subject to any disclaimer, the term of this patent is extended or adjusted under 35 U.S.C. 154(b) by 463 days.

(21) Appl. No.: 12/683,354

(22) Filed: Jan. 6, 2010

(65) Prior Publication Data

US 2011/0165844 A1 Jul. 7, 2011

(51) Int. Cl.
*H04B 7/00* (2006.01)
(52) U.S. Cl. .............. 455/522; 455/13.4; 455/163.1; 455/69; 343/757; 342/372
(58) Field of Classification Search .......... 455/522, 455/13.4, 163.1, 69, 127.1, 25, 63.4, 562.1, 455/575.7; 342/372, 359; 343/757, 766, 343/765, 754
See application file for complete search history.

(56) References Cited

U.S. PATENT DOCUMENTS

| | | | | |
|---|---|---|---|---|
| 3,680,122 | A * | 7/1972 | Graham et al. | 342/455 |
| 6,101,178 | A * | 8/2000 | Beal | 370/336 |
| 6,771,625 | B1 * | 8/2004 | Beal | 370/336 |
| 6,865,395 | B2 * | 3/2005 | Riley | 455/456.1 |
| 6,873,289 | B2 * | 3/2005 | Kwon et al. | 342/372 |
| 7,363,040 | B2 * | 4/2008 | Fukui et al. | 455/454 |
| 7,505,479 | B2 * | 3/2009 | Meng | 370/465 |
| 2004/0203880 | A1 * | 10/2004 | Riley | 455/456.1 |
| 2005/0277426 | A1 * | 12/2005 | Evans et al. | 455/456.1 |
| 2008/0136703 | A1 * | 6/2008 | Yoshimura | 342/89 |
| 2008/0290738 | A1 * | 11/2008 | Greene et al. | 307/145 |
| 2008/0290822 | A1 * | 11/2008 | Greene et al. | 315/363 |
| 2009/0152954 | A1 * | 6/2009 | Le et al. | 307/110 |
| 2010/0208633 | A1 * | 8/2010 | Takano | 370/310 |
| 2011/0070842 | A1 * | 3/2011 | Kwon et al. | 455/67.13 |
| 2011/0103248 | A1 * | 5/2011 | Le Houerou et al. | 370/252 |
| 2011/0221547 | A1 * | 9/2011 | Tezuka et al. | 333/236 |
| 2012/0044057 | A1 * | 2/2012 | Kang et al. | 340/10.4 |

* cited by examiner

*Primary Examiner* — Minh D Dao

(57) ABSTRACT

Two or more transceiver units can interact with each other via millimeter wave radio frequency signals. One of the transceiver units can detect time-varying signals having specific waveforms in order to initiate an action such as establishment of a communication link, powering a piece of equipment and the like. The time-varying signal can be generated by a user moving one of the transceiver units and/or by passing an non-transmissive obstruction in between the transceiver units. Related apparatus, systems, and methods are also disclosed.

22 Claims, 8 Drawing Sheets

COMMUNICATIONS SYSTEMS MANAGEMENT USING MM-WAVE BASED MOTION SENSING

BACKGROUND

As the number of wireless and wired electronic devices increases in residential and office environments, so does the likelihood of interference amongst such devices. Various wireless connections can cause such interference such as cell-phone to base station connections, WiFi-connections, Bluetooth connections, inductive coupled connections RFID based connections, and the like. In a number of these systems (such as cell-phone, WiFi and Bluetooth) the connection occurs through narrow pulses in time domain. Thus, the power dissipated to initiate and establish the connection is minimized. The inductive couple connections and RFID recognition systems of the type that include an interrogator and a transponder (RFID interrogation connection) are popular; and, used for toll collection and inventory control respectively.

With inductively coupled transmitter-responder arrangements, an interrogator generates an AC power field and a receiving responder tag may be positioned at a preselected position. The interrogator generated AC power is received by the responder tag through inductive coupling; and, the responder tag is activated. A uniquely coded signal particular to that tag can then be generated. In this type of transmitter-responder arrangement, the magnetic field is utilized for responsiveness. This system relies on near-field interaction and thus the radiation nature of the radio signal is ignored. With such arrangements, magnetic fields do not diminish quickly enough with distance and are not suitable in smaller physical spaces such as offices and residences.

RFID, instead of relying only on the magnetic fields, relies on electromagnetic energy for activation. Like inductive coupled systems, typical RFID recognition systems contain an interrogator (the first unit) and at least one tag (also referred as a transponder or the second unit). The tag or transponder rectifies the RF electromagnetic field in its vicinity and depending on the RF power strength may change its state. The RF field is generated by the interrogator which is thus able to control the tag. The amount of energy decreases as the tag goes away from interrogator. The received RF field at the transponder is critical in determining the behavior of the transponder.

The radiation pattern near the interrogator is characterized as near-field, while the radiation pattern away for the interrogator a far-field. When the transponder is near-field, the received energy strength can change substantially with slight displacement. In the far-field the received power by the transponder is more deterministic given by the following equation:

$$P_{Rx} = \frac{P_{Tx} G_{Tx} G_{Rx} \lambda^2}{(4\pi D)^2} \quad (1)$$

In equation (1), $P_{Rx}$ is the received power at the transponder, $P_{Tx}$ is the transmitted power of the interrogator, $G_{Tx}$ is interrogator's transmitter antenna gain, $G_{Rx}$ is transponder's receiver antenna gain, D is the distance between the receiver and transmitter, and λ is the wavelength. In this equation $P_{Tx}$, $G_{Tx}$ and $G_{Rx}$ are fixed quantities determined by interrogator output power, transmitter antenna gain, and the receiver antenna gain respectively. Equation 1 is valid when the receiver antenna is in far-field region of the transmitter antenna. At 3 GHz, the wavelength of wireless signal is about 10 cm in air. So as the distance between the interrogator and transponder increases from 10 cm to 20 cm the signal strength at the receiver drops by ¼ (or 6 db) and from 20 cm to 40 cm it drops by another ¼ and so on. The signal strength decreases by 12 dB when distance is increased four folds. Equation (1) is invalid when there is significant scattering. The above equation is valid for all frequencies ranging from low microwave frequency to high millimeter wave frequencies.

In some toll booth systems, a threshold detector is in communication with an antenna to measure the power level of an RF interrogation. When the power level is greater than a certain threshold, the system initiates further testing using modulated signals to verify the present modulation state. When both of these states meet predefined conditions, a corresponding transponder can be enabled. Such arrangements are not appropriate for office or residential applications.

In a typical office environment there are many wireless signals. To name a few, cordless phones at 900 MHz, 1800 MHz and 5000 MHz, Cell phone between 0.9 GHz-2 GHz, Bluetooth in 1-2 GHz, Gaming devices, Computer generated noise and many others. These signals can increase background noise and cause interference. A pre-selection filter is therefore needed to remove the spurious signals. However, such filter can be prohibitively expensive for consumer electronic use. Alternatively, the transmit power $P_{Tx}$ and thus the threshold be increased so that all of the interference is made comparatively small. However, the increase of $P_{Tx}$ is not possible because of Federal Communication Commission (FCC) and other regulation. In addition, in a home or office environment there maybe plethora of transponder type devices, all of the devices would see the interrogator power. The transponder (or the second unit) would all be switched on simultaneously in response to the interrogators signal power. This, therefore, results in significant power waste.

Conventional techniques for selectively initiating communications are complicated when there are a large number of transceiver units within a relatively small area (such as residences and offices).

SUMMARY

In one aspect, a transceiver unit includes a transmitter, a transmitter antenna, a receiver, a receiver antenna, and a control circuit. The transmitter transmits millimeter wave radio frequency signals to a remote transceiver unit that in turn has a remote transceiver transmitter, a remote transceiver transmitter antenna, a remote transceiver receiver, and a remote transceiver receiver antenna. The transmitter antenna is coupled to the transmitter. The receiver is configured to receive millimeter wave radio frequency signals from the remote transceiver unit. The receiver antenna is coupled to the receiver to receive millimeter wave radio frequency signals transmitted by the remote transceiver unit. The strength of the power of the signals received by the receiver antenna is inversely related to the distance between the receiver antenna and the remote transceiver transmitter antenna. The signal strength is also dependent on an orientation of the remote transceiver transmitter antenna in relation to an orientation of the receiver antenna. The control circuit is coupled to the transmitter and the receiver to selectively control the transmission of signals by the transmitter and to characterize signals received by the receiver. The control circuit initiates an action when a time-varying signal having a pre-defined waveform is received by the receiver.

The pre-defined waveform can be based on the amplitude of the detected signal strength increasing and exceeding a pre-defined threshold. The time-varying signal can be dependent on a physical medium separating the receiver antenna and the remote transceiver transmitter antenna and/or it can be dependent on a repetitive displacement of the remote transceiver transmitter antenna and/or it can be dependent on a movement of the remote transceiver transmitter antenna relative to the receiver antenna and/or it can be dependent on a movement of a non-transmissive element adjacent to the remote transceiver transmitter antenna. The pre-defined waveform can comprise a series/train of pulses.

The transceiver unit can include memory coupled to the control circuit storing one or more of the pre-defined waveforms. Alternatively or in addition, the control circuit communicates with a remote database to obtain one or more of the pre-defined waveforms and/or control data pertaining to a particular transceiver unit. The control circuit can further identify the remote transceiver unit based on the received signal.

The remote transceiver transmitter can transmit signal in the 60 GHz band. In such cases, the initiated action can comprise the establishment of a communication link between the transceiver unit and the remote transceiver unit in the 60 GHz band. Such a communication link can support data transfer of a rate of up to six gigabytes per second.

The separation distance between the transceiver unit and the remote transceiver unit can be up to or equal 10 meters. In some implementations, the separation distance is much smaller, being less than or equal to 25 centimeters.

The action can comprise initiating communication between the transceiver unit and the remote transceiver unit. Such a communication can be selected from a protocol comprising wireless network, cell-phone, Bluetooth, wire network and peer-to-peer networks. The action can comprise generating an activation signal to initiate a subsequent action.

The transceiver can include an indicator light that is illuminated when communications are initiated between the transceiver unit and the remote transceiver unit.

The transceiver unit can also include a receiver circuit coupled to the receiver. The receiver circuit can include a diode detector, a capacitor, a low-noise amplifier, a mixer, an oscillator, and a baseband processor. The diode detector can be coupled to the receiver antenna to receive RF signal received by the receiver antenna. The diode detector can also rectify the RF signal to generate a DC level and include a biasing inductor connected to ground, that feeds bias for the diode detector. The capacitor can be coupled to a cathode of the diode detector for DC generation and storage. The switch can be disposed between the diode detector and the receiver antenna to transmit signal from the receiver antenna to the diode detector (and the switch can have three terminals). The low-noise amplifier can be connected to one of the terminals of the switch to amplify the received signal. The mixer can be coupled to the low-noise amplifier for down-conversion of the amplified received signal to a baseband signal. The oscillator can generate a source frequency to be utilized by the mixer in connection with the down-conversion of the amplified received signal to the baseband signal, the oscillator further being coupled to the transmitter. The baseband processor can process the baseband signal to recover information contained therein.

In an interrelated aspect, a system includes a primary transceiver unit and a plurality of remote transceiver units. Each remote transceiver unit can have a remote transceiver transmitter, a remote transceiver transmitter antenna, a remote transceiver receiver, and a remote transceiver receiver antenna. The primary transceiver unit can comprise a transmitter, a transmitter antenna, a receiver, a receiver antenna, and a control circuit. The transmitter can transmit millimeter wave radio frequency signals to the remote transceiver units, and the transmitter antenna can be coupled to the transmitter. The receiver can receive millimeter wave radio frequency signals from the remote transceiver units. The receiver antenna can be coupled to the receiver to receive millimeter wave radio frequency signals transmitted by the remote transceiver units. The control circuit can be coupled to the transmitter and the receiver to selectively control the transmission of signals by the transmitter and to characterize signals received by the receiver. The control circuit can initiate an action associated with the corresponding remote transceiver unit when a time-varying signal having a pre-defined waveform is received by the receiver.

The subject matter described herein provides many advantages. For example, the current techniques allows for increased security between transceiver units while avoiding interference from other devices as well as the generation of false control signals. Furthermore, the transceiver units can be controlled by physical moving the units closer or touching; and, also by swaying the direction of beam; thereby, allowing direct and simple control of the units by the user. Due to the nature of attenuation with distance, mm-wave frequency is attenuated in few inches. As a result non-intended units in the room do not see the strong signal and thus do not switch on (or perform some other action). In addition, the current subject matter provides easy-to-use protocols that consume less power (and as a result are less costly to operate and manufacture).

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
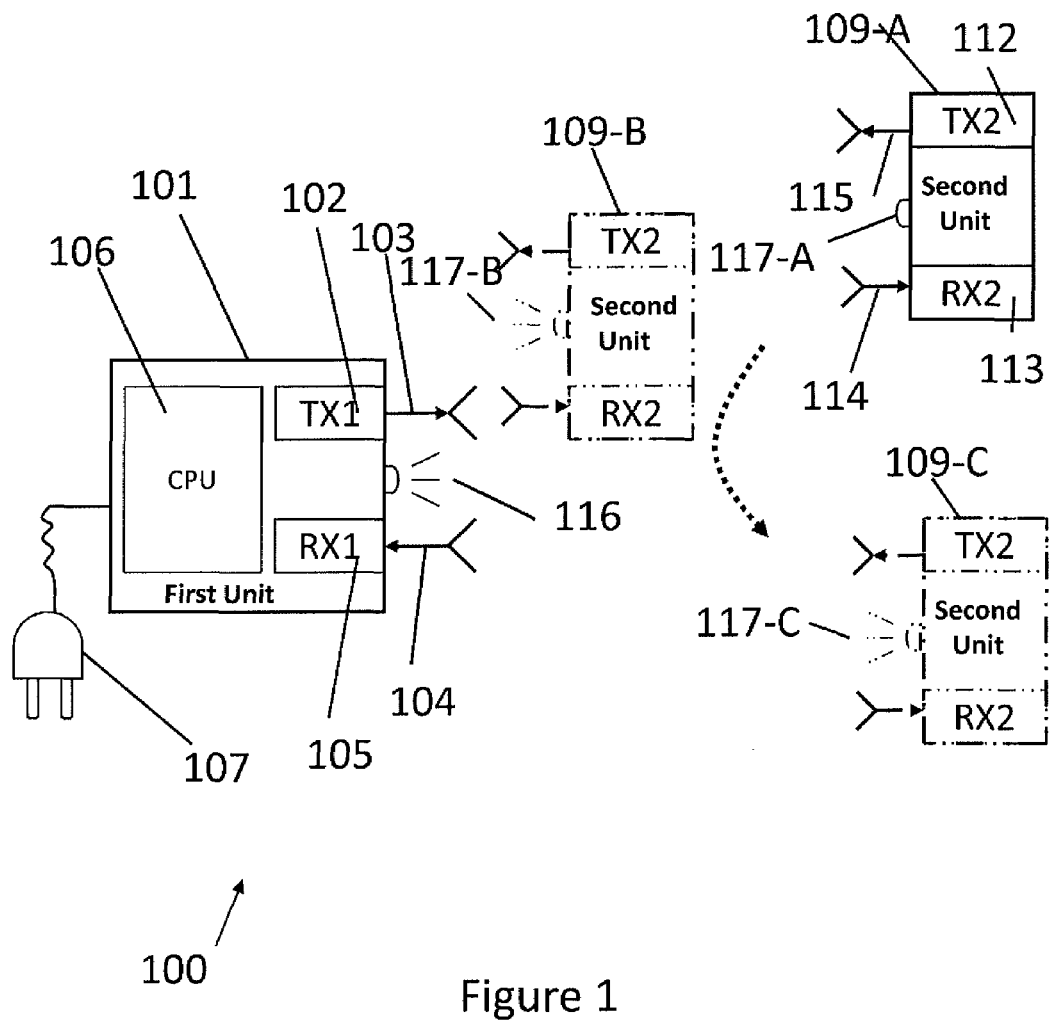
FIG. 1 is a diagram illustrating first and second transceiver units containing at least one mm-wave transmitter and one mm-wave detector.

FIG. 1 is a diagram 100 illustrating a system having a first transceiver unit 101 that is remote from a second transceiver unit 109. The first transceiver unit 101 can include a transmitter 102 (referenced as TX1) that can generate RF signals for transmission, a transmitter antenna 103 coupled to the transmitter 102 that can transmit RF signals, a receiver antenna 104 that can receive RF signals, a receiver 105 (referenced as RX1) coupled to the receiver antenna 104 that can process RF signals received by the receiver antenna 104, and a processor 106 for controlling and coordinating the receipt and transmission of signals. The first transceiver unit 101 can be hard wired to a power source (via, for example, a power cord 107 when the first transceiver unit 101 is stationary), or it may contain a self-contained power source such as a battery (when the first transceiver unit 101 is mobile). The first transceiver unit 101 can also include an indicator light 116 that is illuminated when a connection is stabilized (as described below). The first transceiver unit 101 can optionally include memory that stores various pre-defined waveforms (as described below) or it can optionally be coupled to a remote data source (e.g., database accessible via a web service, etc.).

The second transceiver unit 109 can include a second unit transmitter 112 marked as TX2 and second unit receiver 113 marked as RX2. The second unit transmitter 112 can used to transmit RF signal while the second unit receiver 113 can receive RF signal. The second transceiver unit 109 can have a transmitter antenna 115 and a receiver antenna 114.

The current subject matter can, in some implementations, utilize millimeter wave or mm-wave frequencies which typically range from 20 GHz to 200 GHz. In particular, 57-to-65 GHz or the 60 GHz band and 22 GHz-to-29 GHz or the 25 GHz bands.

The second transceiver unit 109 is shown in three separate positions marked as 109-A, 109-B and 109-C respectively. The second transceiver unit 109 can be physically separate from the first transceiver unit 101 by a medium such air or any dielectric that allows transmission of radio frequency signals. The units marked 109-B and 109-C are drawn using phantom lines and represent the unit 109-A being moved closer to first transceiver unit 101 to the position 109-B, and then moved away from the first unit 101 represented by the position 109-C. The distance between position marked by 109-A and 109-B can be about 1 cm to about 25 cm (although some implementations allow for a separation distance of up to 10 m). Similarly, the distance between 109-B and 109-C can be of the same order. The smallest separation between the first and second transceiver units 101, 109 occurs at position 109-B and can be of the order of 10 cm or lower. In some implementations, the first transceiver unit 101 may physically contact the second transceiver unit 109.

The second transceiver unit 109 can include an indicator 117 marked as 117-A, 117-B and 117-C in the three different positions. In position 109-B and 109-C, the indicator is lit (on), while in position 112 the indicator is off. When lit, the indicator 117 may indicate that the connection has triggered a control.

Figure 2:
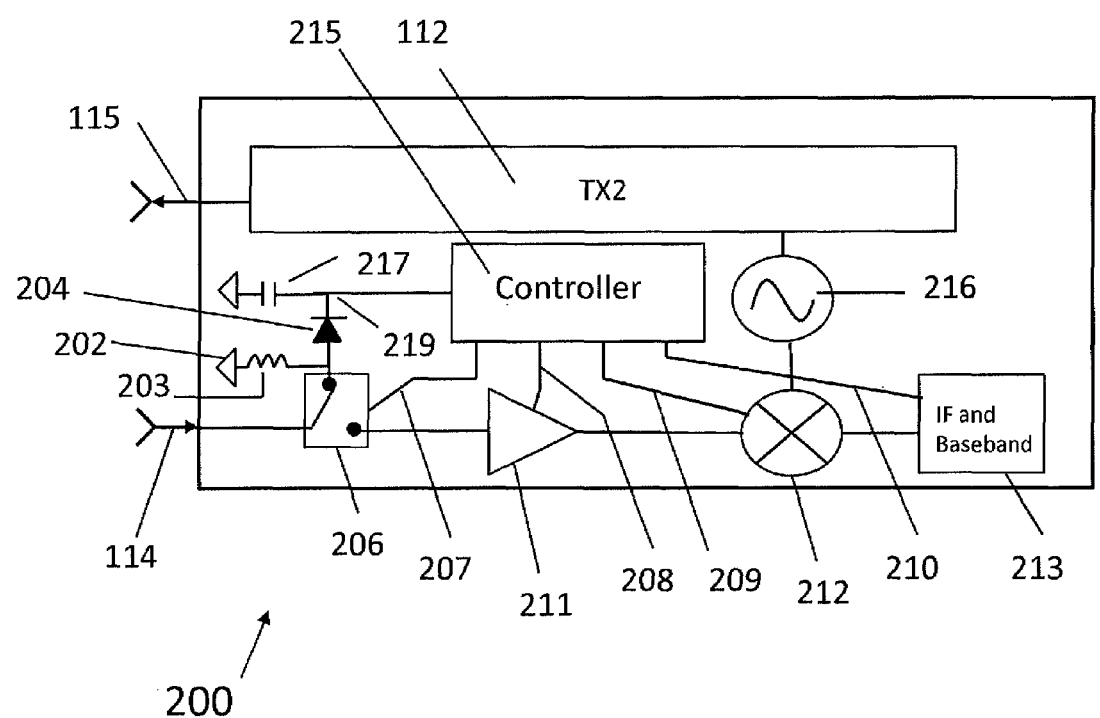
FIG. 2 is a diagram illustrating an RF circuit used to make connection and has a mm-wave detector.

FIG. 2 is a diagram 200 of an circuit for the second transceiver unit 109. In particular, the receiver circuitry for the second transceiver unit 109 is explained in more detail. Receiving antenna 114 can receive the RF signal that is transmitted to a diode detector 204 that rectifies the RF signal thereby generating a DC level. The diode detector 204 can have biasing inductor 203 that is connected to ground 202. The inductor 203 can be used for feeding bias for the detector diode 204. The cathode of the diode detector 204 can be connected to a top of a capacitor 217. The capacitor 217 can be used for aiding DC generation and storage. A switch 206 can be used to transmit the signal from antenna 114 to the diode detector 204. The switch 206 can have three terminals and the third terminal can be connected to a low-noise amplifier (LNA) 211. The LNA 211 can amplify the signal in a low noise manner and feed such signal into a mixer 212 that can be used for down-converting the received signal. An oscillator 216 can generates a source frequency (also called the Local Oscillator or LO) and can be utilized in the mixer 212 to down convert the signal to baseband signal. The baseband signal feeds into the IF and a baseband processor 213. The baseband processor 213 can recover the information in the received signal. The oscillator 216 can also be used in TX2 chain that outputs at the transmitter antenna 115.

When the second transceiver unit 109 of FIG. 1 is in position 109-A, it receives a certain amount of power. If second transceiver unit 109-A is sufficiently far the received power from the transmitter 102, is sufficiently low. As the power is low, the diode 204 is not able generate a sufficient DC signal into a controller 215 within the second transceiver unit 109. As a result the receiver 113 does not respond. On the other hand, when the second transceiver unit 109 is in position 109-B, and is sufficiently close, it receives sufficient power such that diode 204 is able to rectify and generate a sufficiently high DC signal that goes into the controller 215. When a high signal is received by the controller 215, it can cause a sequence of events that turns on the receiver 113. Subsequently transmitter 112 can also turn on. Once the receiver chain is turned on it can synchronize with the first transceiver unit 101 and starts communicating.

In a typical room, the signal levels can change drastically and in modern office environments there is very high chance of interference amongst wireless devices. As mentioned above, a number of coding and decoding techniques have been used to overcome interference problems. But none of the techniques work successfully in room environment utilizing received signals power for triggering control. To avoid the random changes in signal level, the first and second transceiver units 101, 109 can use mm-wave bands (approximately 30-300 GHz) instead of the 0.5-10 GHz frequencies currently used. As FCC has assigned 57-64 GHz band for unlicensed short range communications, this band (referred as 60 GHz band) is very attractive.

Figure 3:
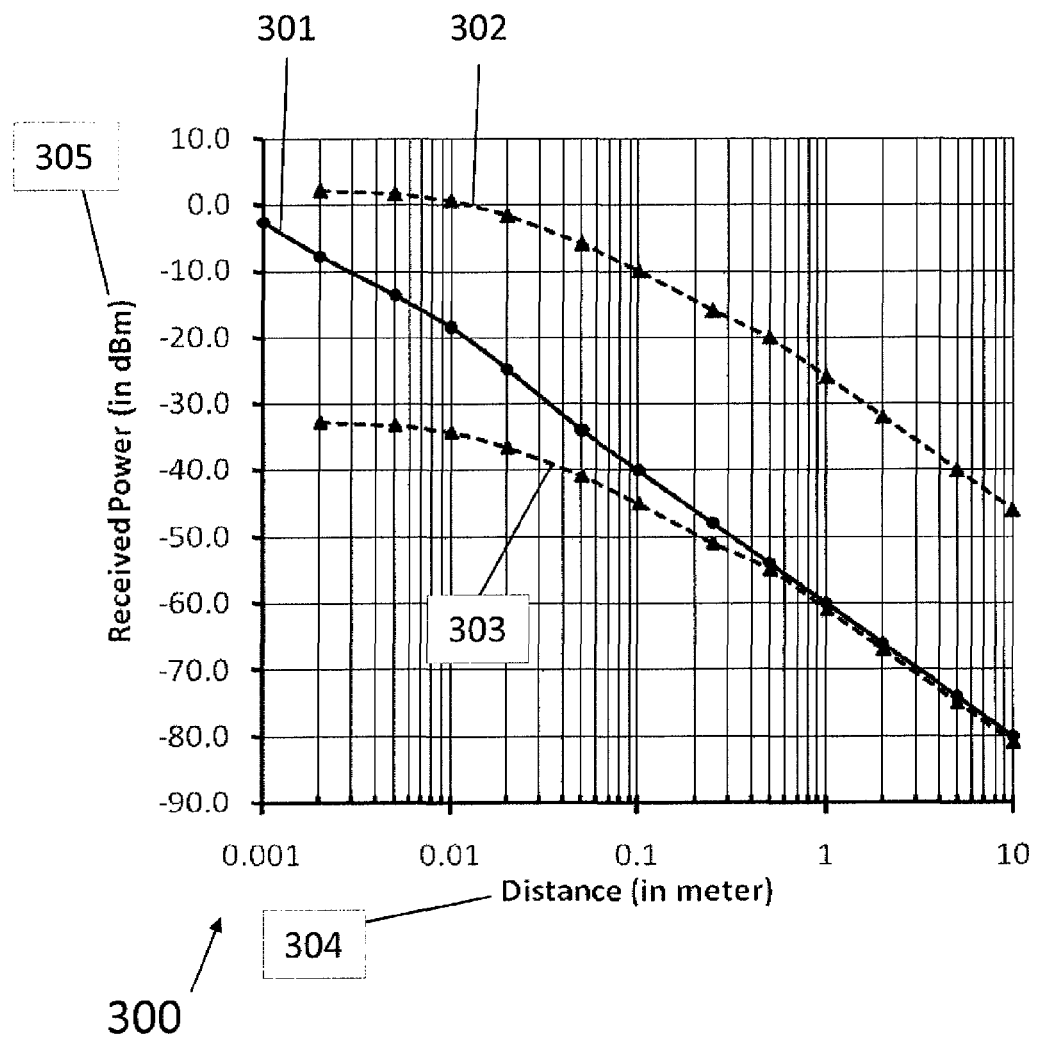
FIG. 3 is a diagram illustrating typical received power versus separation distance for 60 GHz and 1.2 GHz signals.

FIG. 3 illustrates received signal power versus distance for 60 GHz and 1.2 GHz frequencies. This data was obtained through electromagnetic simulation where the transmit power was assumed to be 10 dBm. With this example, both the transmitter and receiver are assumed to have dipole antenna. The distance between the receiver and the transmitter is changed to generate the graph. Referencing FIG. 3, line 301 shows the received power 305 at the receiver versus distance 304 when the transmit frequency is 60 GHz as distance between the units is changed. In general, the signal strength increases by 20 dB with a factor of 10 reduction in distance. This condition is true until the transponder is in the near field region. For 60 GHz, the near field region starts at 1 cm. In the near-field region, the energy change versus distance is reduced and becomes unpredictable.

With reference again to FIG. 3, curve 302 shows the power received by the 1.2 GHz system with 10 dBm power and curve 303 with −25 dBm power. The curve with −25 dBm shows the detected signal with distance such that it is more easy to compare with the curve for 60 GHz curve 301. Near-field for 1.2 GHz signal is of the order of 60 cm. Thus, the power level at 60 GHz is more predictable when the distances are of the order of less than 60 cm. Therefore, a graceful degradation of power occurs at 60 GHz compared to 1.2 GHz when the distance changes and this is true all the way to 1 cm. Similarly mm-wave (>20 GHz) may be used for this very reason. The current subject matter, in some implementations, can use mm-wave frequencies for establishing short range integrator and transponder communication. Unlike toll booth applications, devices incorporating the subject matter described herein can be hand-held such that a user can move the device to close proximity (few millimeters) or move it away (few centimeters). During this duration the power can drop substantially, indicating a triggering of event. Further the user can repeat the triggering actions as often as needed. In addition, to its use for forming connection with nearby units, the 60 GHz band can also be used for high data rate communication; thus, the same electronics can used to detect-and-form connections and additionally for high speed communications. This happens when switch 206 of FIG. 2 is connected to the low noise amplifier 211; thereby, activating the receiver for broadband communication.

Figure 4:
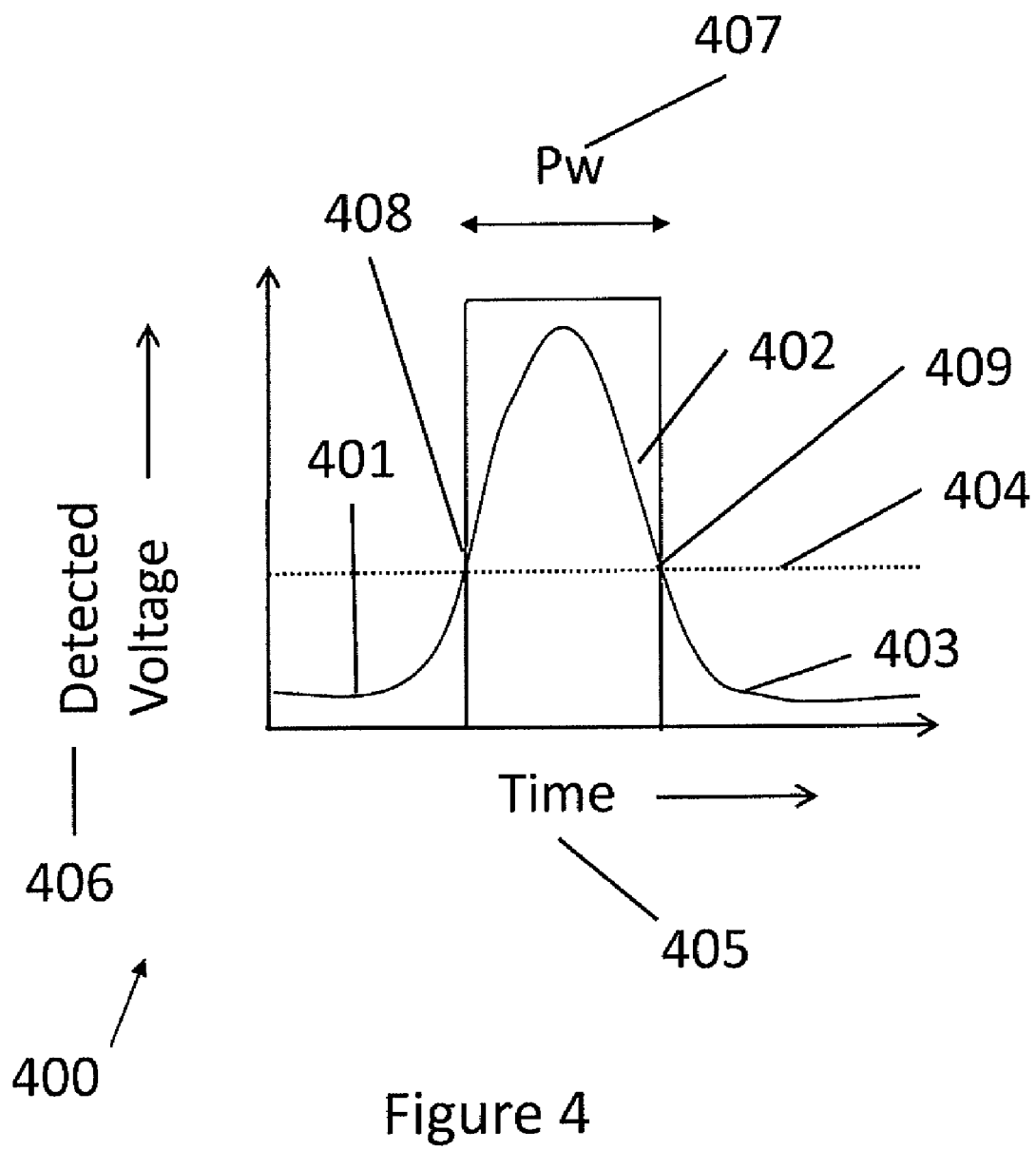
FIG. 4 shows a pulse train generated by relative motion of transceiver units as in FIG. 1.

FIG. 4 is a diagram 400 illustrating the waveform at the cathode of diode 219, shown in FIG. 2, when the second transceiver unit 109 is moved from 109-A to 109-B to 109-C in FIG. 1. Plotted in the vertical direction is detected voltage 406 at the cathode versus time on horizontal axis 405. As the units are spaced apart during the position depicted by 109-A, the detected signal is low and depicted by the curve section 401. As the separation decreases the detected signal increases till it reaches the peak at position 109-B. This is depicted by curve section 402. As the unit moves to position 109-C the signal drops down and is shown by a second low value curve section 403. This signal is fed into the controller 215 of FIG. 2. The controller 215 has a threshold level depicted by line 404. When the detected signal exceeds the threshold line as at the label 408, the controller 215 may trigger and launch a sequence of steps to provide some controlling action on the second transceiver unit 109. Alternatively the sequence of steps could occur when the detected signal goes below the threshold as in point indicated by label 409. In this example, the controller 215 converts the signal into a pulse of duration Pw indicated by 407. The generated pulse has square wave characteristics with certain pulse width. Depending on how the units are moved relative to each other various pulse characteristics can be generated. This characteristic of the pulse can then be used for controlling the transceiver units 101, 109.

Figure 5:
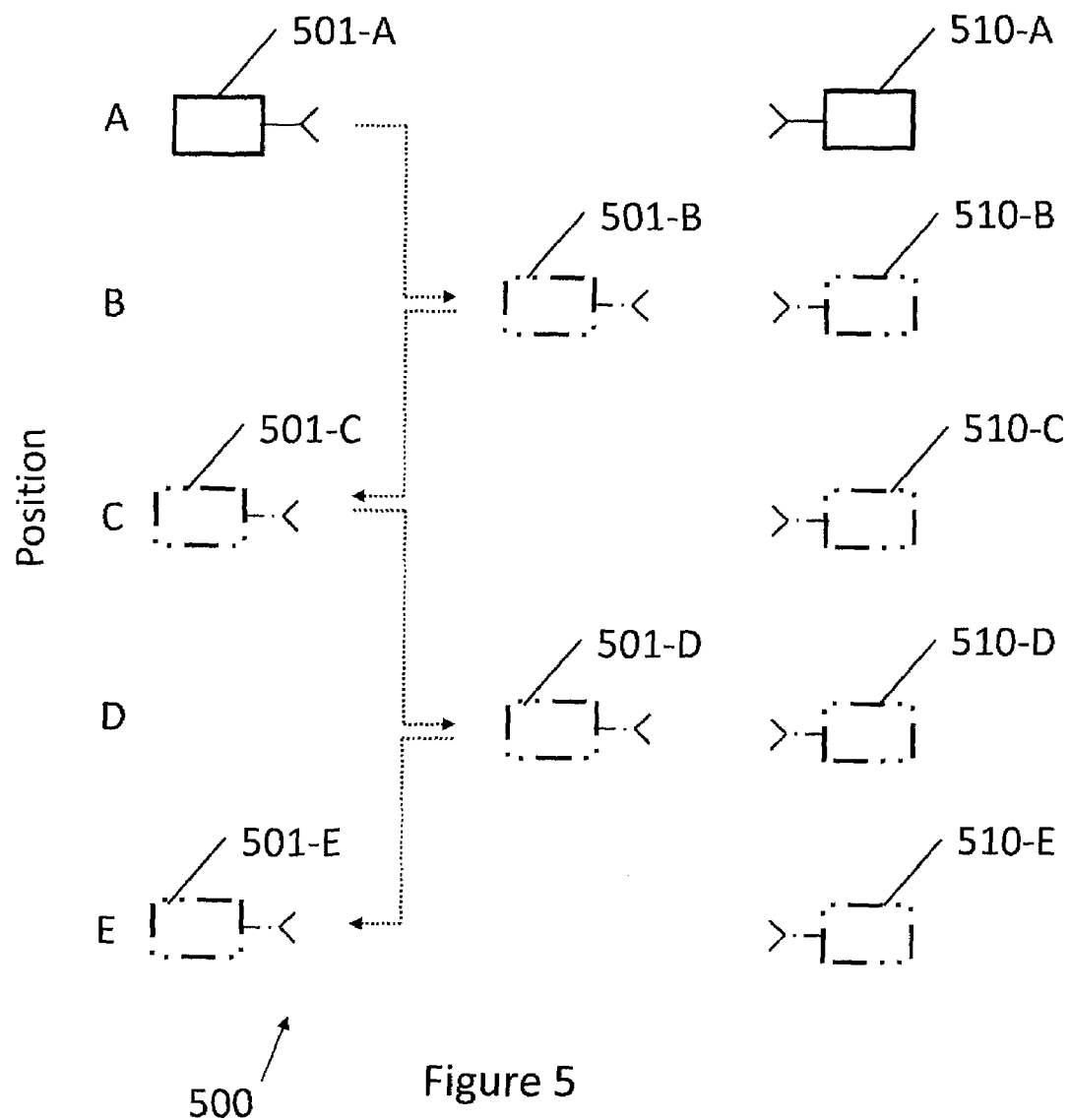
FIG. 5 is a diagram illustrating creation of two pulse by moving a relative position of a transceiver unit.

FIG. 5 is a diagram 500 that illustrates an approach where two pulses are generated. In the figure, both the first and the second pulses are represented by a rectangular box (containing electronics) and an antenna. This is representation and can be replaced by a number of other possibilities including just an antenna. With this example, it is assumed that the first unit transmits mm-wave signal while the second unit has a corresponding detector diode. However, it the respective roles can be easily interchanged without changing the overall focus of this specification. The first transceiver unit 501 goes from position A to position B shown with phantom lines 501-B. During the same time the second unit 510 stays in its location and is shown with phantom lines 510-B. As result the transceiver units 501-B, 510-B come closer. In the next step the first unit 501-B moves to position C shown in phantom line 501-C. During the same time the second unit 510 shown with phantom lines 510-B stays in its location and is shown with phantom lines 510-C. Now the distance between the units 501, 510 is increased. In the next step, the first unit 501 shown with phantom lines 501-C moves to position D shown in phantom line 501-D. During the same time the second unit 510 shown with phantom lines 510-C stays in its location and is shown with phantom lines 510-D. Now the distance between units is decreased. In the next step, the first unit 501 shown with phantom lines 501-D moves to position E shown in phantom line 501-E. During the same time the second unit shown with phantom lines 510-D stays in its location and is shown with phantom lines 510-E. Now the distance between units 501, 511 is increased. Thus these steps describe an action where the units 501, 510 come closer and then separate and then come closer again.

Figure 6:
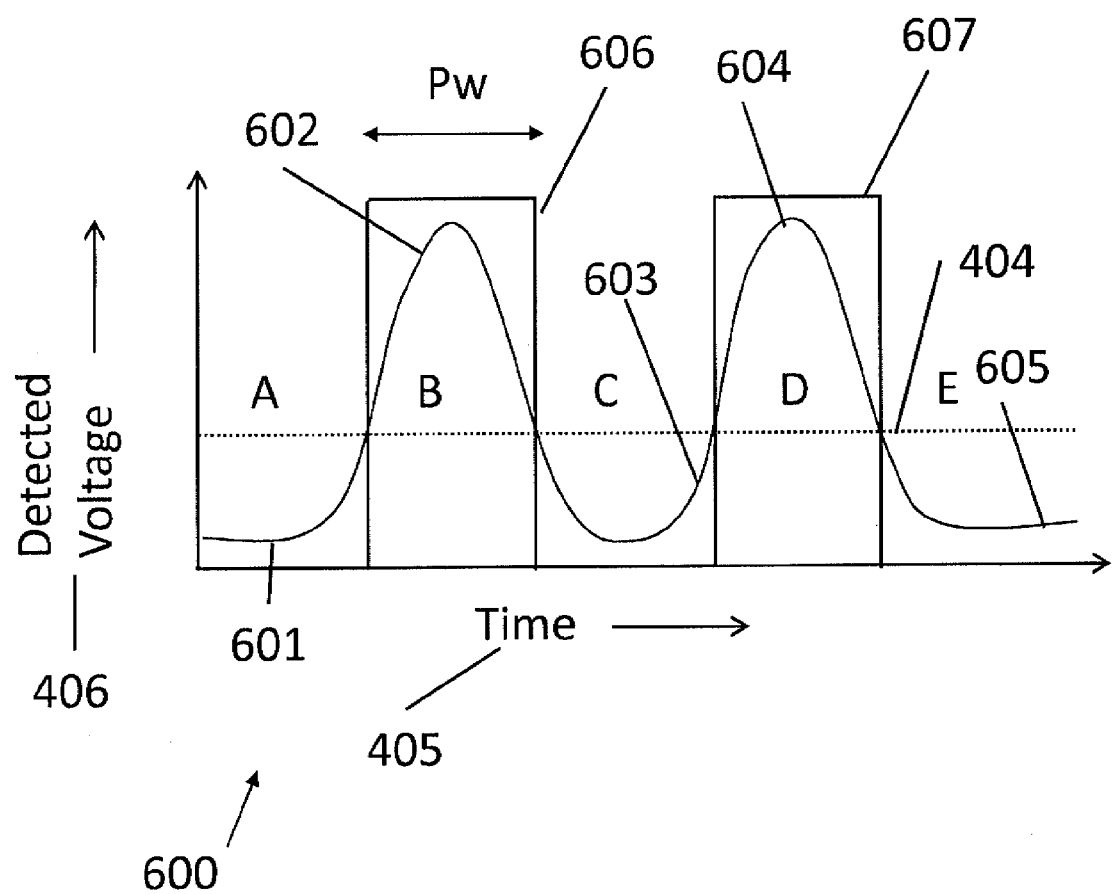
FIG. 6 is a diagram illustrating a detected waveform having a characteristic of two pulses.

The effect of the physical displacement of the first and second units is shown in the diagram 600 of FIG. 6. FIG. 6 plots the detected voltage at the cathode of the diode 219 shown in FIG. 2 that is included in the second unit 510. For position A of FIG. 5, because the separation between units 501, 510 is large, the detected signal is small and the curve section labeled 601 shows low signal level. For position B of FIG. 5, the units 501, 510 come closer. As a result the received signal is large and depicted by curve labeled 602. Similarly in position C of FIG. 5, the units 501, 510 are further away and detected signal is smaller thereby producing curve section 603. Similarly in position D and E of FIG. 5, curve sections 604 and 605 are produced respectively. Clearly by displacing the units 501, 510, the receive-signal can be varied with time.

When the receive signal is sufficiently strong, the detected signal derived from the receive-signal exceeds a threshold voltage. As a result two pulses are generated. These pulses are depicted in FIG. 6 by curves 606 and 607. The controller 215 examines this time domain waveform and based on pulse characteristics it performs the required controlling action. Such controlling action may include but is not limited to switching ON-or-OFF of the unit or performance of other controlling action such as communication link formation. Also note while only two pulses have been show, multiple pulses can be generated by repeatedly changing the separation between the units 501, 510. For example, one arrangement could require a number of pulses as a benchmark to trigger control signal. Alternatively, the rate of change of the detected signal may be utilized for determining the trigger event. Thus a number of possible characteristics of the pulse could be used for control trigger. Repeated or complex pulse characteristics can be adopted to avoid false trigger and saves considerable power.

Figure 7:
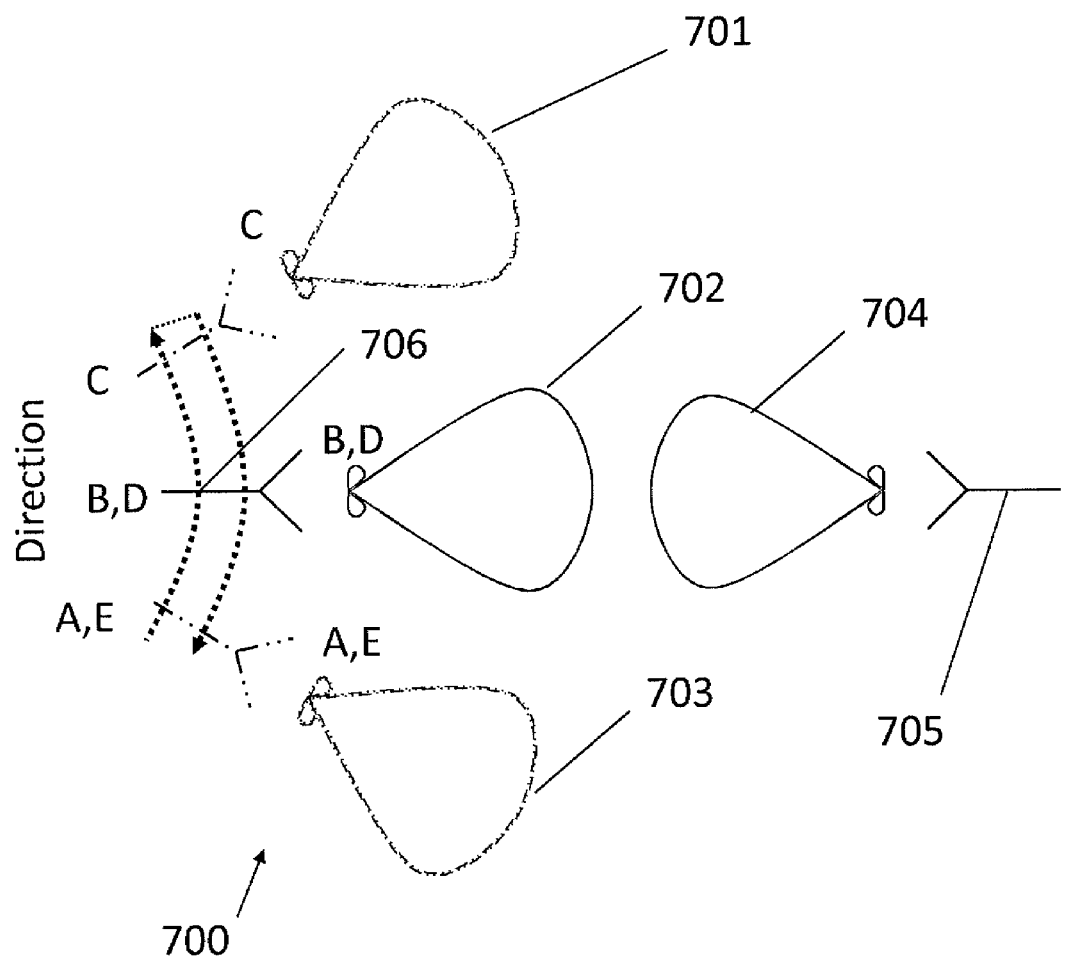
FIG. 7 is a diagram illustrating an alternative way of creating a waveform as in FIG. 6 by pointing the antenna of transmitting transceiver unit away from the receiving transceiver unit.
Figure 8:
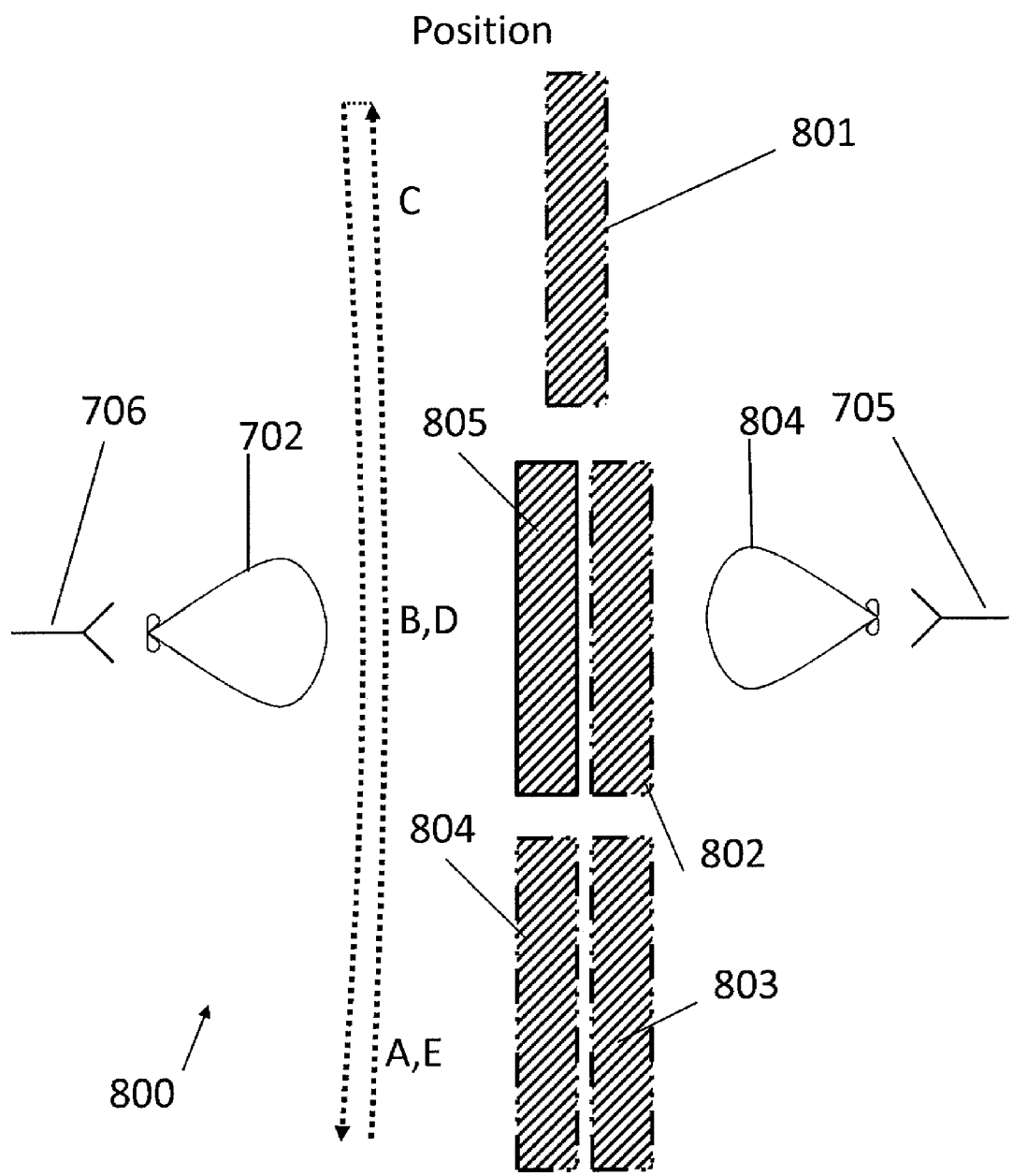
FIG. 8 is a diagram illustrating creation of a waveform as in FIG. 6 by changing the characteristic of the transmitting medium through introduction of an obstacle.

While physical displacement of the relative positioning of the two units 501, 510 can achieve the required pulse formation, it is the not the only means for creating modulated signal. The diagram 700 of FIG. 7 shows an approach that utilizes the antenna direction, while the diagram 800 of FIG. 8 shows the use of an obstacle such as a human hand for control initiation. In FIG. 7, 706 represent the transmitter antenna 103 of the first transceiver unit 101 (the box is omitted for brevity) while 705 represents the receiver antenna of the second transceiver unit 110. With this implementation, for exemplary purposes, it can be assumed that the first unit 101 transmits mm-wave signal while the second unit 110 has the detector diode. However, it is clear that this role can be easily interchanged without changing the overall focus of this specification. Each of these antennas 103, 115 tends to radiate (receive) signal in greater strength towards (from) some direction than in others. This is depicted by an antenna pattern that shows the direction of the beam. For antenna 706, the shape 702 is a representative antenna pattern and it has peak in the direction of receiver antenna 705. As shown in Equation 1, the receive signal is proportional the antenna gain. In simpler terms, if the beam of antenna 706 is directed toward antenna 705 the signal strength would be higher. Conversely when the antenna 706 is directed away from antenna 705 the gain is lower. This feature of the equation 1 is exploited. Thus, the antenna 706 (which could represent a handheld device) is turned away from the antenna 705. The position marked A, B, C, D and E in FIG. 7 indicates a possible orientation that would result in a waveform very similar to FIG. 6. This, thereby, shows that pulse generation can also be accomplished by axial movement.

Also note that either of the units 101, 110 can have a varying axial movement. At the transmitter end, the axial movement would change the transmitted signal and send it towards-certain-spatial-direction. Similarly by changing the receiver, the received signal is received from-certain-spatial-direction. Also beams can be redirected using electronic means such as alternate antenna or changing load on the antenna.

FIG. 8 is a diagram 800 illustrating how transmission characteristics of the medium can be changed. An obstacle object 805 (also shown in different position by 801, 802, 803, 804), which is made of metal block, body part, or any material, is interposed between the antenna 705 and 706. Because the beam encounters this object 805 its strength at the receiver is changed. By moving the object 805 in-and-out of the path a modulation can be generated. For the waveform in FIG. 6, the object 805 needs to be moved from A to B to C to D to E. The object in effect has changed the medium that separates the two antennas.

Aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While the current subject matter is generally described in connection with two transceiver units, it will be appreciated that a network of such units can be utilized (with combined mobile and fixed systems). In all of these units, mm-wave signals can be utilized for generating a control signal thereby forming a connection between units.

Although a few variations have been described in detail above, other modifications are possible. Other embodiments may be within the scope of the following claims.

The invention claimed is:

1. A transceiver unit comprising:
 a transmitter to transmit millimeter wave radio frequency signals to a remote transceiver unit, the remote transceiver unit having a remote transceiver transmitter, a remote transceiver transmitter antenna, a remote transceiver receiver, and a remote transceiver receiver antenna;
 a transmitter antenna coupled to the transmitter;
 a receiver to receive millimeter wave radio frequency signals from the remote transceiver unit;
 a receiver antenna coupled to the receiver to receive millimeter wave radio frequency signals transmitted by the remote transceiver unit, a strength of the power of the signals received by the receiver antenna being inversely related to a distance between the receiver antenna and the remote transceiver transmitter antenna and being dependent on an orientation of the remote transceiver transmitter antenna in relation to an orientation of the receiver antenna; and
 a control circuit coupled to the transmitter and the receiver to selectively control the transmission of signals by the transmitter and to characterize signals received by the receiver, the control circuit initiating an action when a time-varying signal having a pre-defined waveform is received by the receiver.

2. A transceiver unit as in claim 1, wherein the pre-defined waveform is based on the amplitude of the detected signal strength increasing and exceeding a pre-defined threshold.

3. A transceiver unit as in claim 1, wherein the time-varying signal is dependent on a physical medium separating the receiver antenna and the remote transceiver transmitter antenna.

4. A transceiver unit as in claim 1, wherein the time-varying signal is based on a repetitive displacement of the remote transceiver transmitter antenna.

5. A transceiver unit as in claim 1, wherein the time-varying signal is dependent on a movement of the remote transceiver transmitter antenna relative to the receiver antenna.

6. A transceiver unit as in claim 1, wherein the time-varying signal is dependent on a movement of the receiver antenna relative to the remote transceiver transmitter antenna.

7. A transceiver unit as in claim 1, wherein the time-varying signal is dependent on a movement of a non-transmissive element adjacent to the remote transceiver transmitter antenna.

8. A transceiver unit as in claim 1 further comprising: memory coupled to the control circuit storing one or more of the pre-defined waveforms.

9. A transceiver unit as in claim 1, wherein the control circuit communicates with a remote database to obtain one or more of the pre-defined waveforms.

10. A transceiver unit as in claim 1, wherein the remote transceiver transmitter transmits signal in the 60 GHz band.

11. A transceiver unit as in claim 10, wherein initiated action is an establishment of a communication link between the transceiver unit and the remote transceiver unit in the 60 GHz band.

12. A transceiver unit as in claim 11, wherein the communication link in the 60 GHz band supports data transfer at a rate of up to 6 gigabytes per second.

13. A transceiver unit as in claim 1, wherein the separation distance is less than or equal to 10 meters.

14. A transceiver unit as in claim 13, wherein the separation distance is less than or equal to 25 centimeters.

15. A transceiver unit as in claim 1, wherein the control circuit further identifies the remote transceiver unit based on the received signal.

16. A transceiver unit as in claim 1, wherein the pre-defined waveform comprises of a train of pulses.

17. A transceiver unit as in claim 1, wherein the action comprises initiating communication between the transceiver unit and the remote transceiver unit.

18. A transceiver unit as in claim 17, wherein the communication uses a protocol selected from a group comprising: wireless network, cell-phone, Bluetooth, wire network and peer-to-peer networks.

19. A transceiver unit as in claim 17 further comprising: an indicator light that is illuminated when communications are initiated between the transceiver unit and the remote transceiver unit.

20. A transceiver unit as in claim 1, wherein the action comprises generating an activation signal to initiate a subsequent action.

21. A transceiver unit as in claim 1 further comprising a receiver circuit coupled to the receiver, the receiver circuit comprising:
- a diode detector coupled to the receiver antenna to receive RF signal received by the receiver antenna, the diode detector rectifying the RF signal to generate a DC level, the diode detector including a biasing inductor connected to ground, the biasing inductor feeding bias for the diode detector;
- a capacitor coupled to a cathode of the diode detector for DC generation and storage;
- a switch disposed between the diode detector and the receiver antenna to transmit signal from the receiver antenna to the diode detector, the switch having three terminals;
- a low-noise amplifier connected to one of the terminals of the switch to amplify the received signal;
- a mixer coupled to the low-noise amplifier for down-conversion of the amplified received signal to a baseband signal;
- an oscillator to generate a source frequency to be utilized by the mixer in connection with the down-conversion of the amplified received signal to the baseband signal, the oscillator further being coupled to the transmitter; and
- a baseband processor to process the baseband signal to recover information contained therein.

22. A system comprising:
- a primary transceiver unit; and
- a plurality of remote transceiver units, each remote transceiver unit having a remote transceiver transmitter, a remote transceiver transmitter antenna, a remote transceiver receiver, and a remote transceiver receiver antenna;

the primary transceiver unit comprising:
- a transmitter to transmit millimeter wave radio frequency signals to the remote transceiver units;
- a transmitter antenna coupled to the transmitter;
- a receiver to receive millimeter wave radio frequency signals from the remote transceiver units;
- a receiver antenna coupled to the receiver to receive millimeter wave radio frequency signals transmitted by the remote transceiver units, a strength of the power of the signals received by the receiver antenna being inversely related to a distance between the receiver antenna and the corresponding remote transceiver transmitter antenna and being dependent on an orientation of the corresponding remote transceiver transmitter antenna in relation to an orientation of the receiver antenna;
- a control circuit coupled to the transmitter and the receiver to selectively control the transmission of signals by the transmitter and to characterize signals received by the receiver, the control circuit initiating an action associated with the corresponding remote transceiver unit when a time-varying signal having a pre-defined waveform is received by the receiver.

* * * * *